Figure 1:
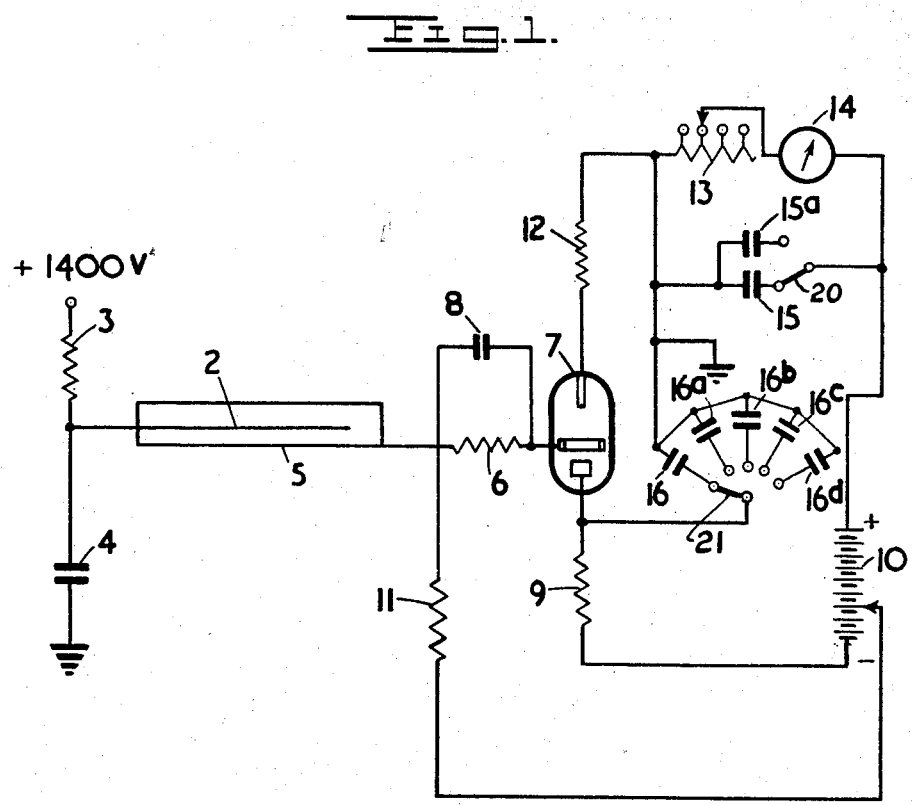

Oct. 19, 1954

E. FRANKLIN 2,692,339

GAMMA-RAY DETECTOR

Filed Aug. 23, 1948

2 Sheets-Sheet 1

Ernest Franklin,
Inventor

By Cushman, Darby & Cushman
Attorneys

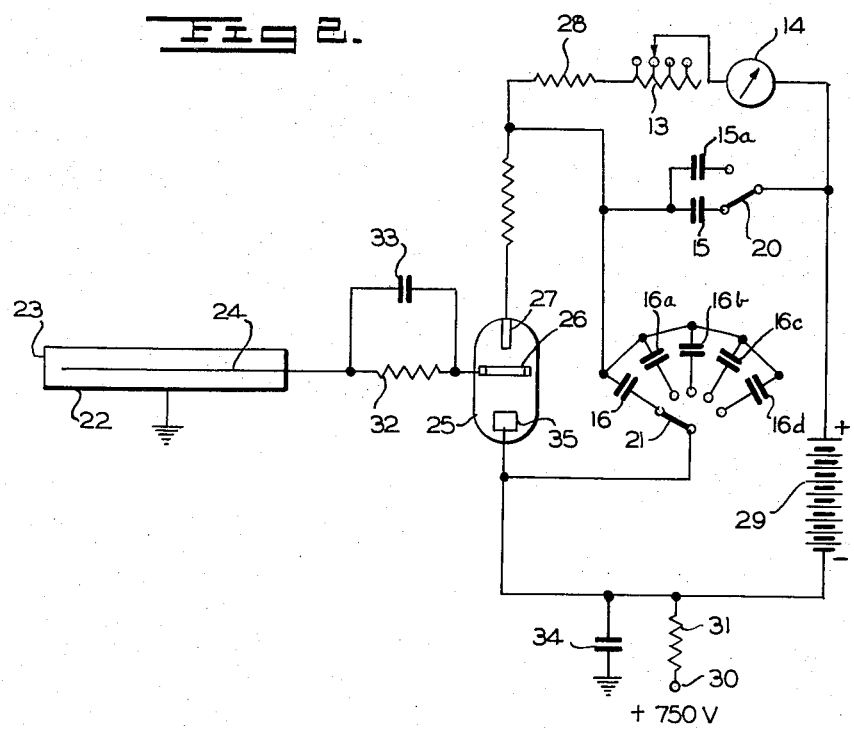

Patented Oct. 19, 1954

2,692,339

UNITED STATES PATENT OFFICE 2,692,339

GAMMA-RAY DETECTOR

Ernest Franklin, West Malvern, England, assignor, by mesne assignments, to The National Research Development Corporation, London, England, a British corporation Application August 23, 1948, Serial No. 45,743

Claims priority, application Great Britain September 2, 1947

22 Claims. (Cl. 250—83.6)

The present invention relates to gamma-ray detectors employing Geiger-Müller and like ionization devices arranged to give rise to electrical pulses in response to incident gamma rays. Such detectors are used, for example, to detect the presence of gamma-ray intensities greater than normal at points on or near the earth's surface or for studying the gamma-ray activity of mineral samples or other substances or articles believed to be radio-active.

One object of the invention is to provide a gamma-ray detector, which is portable and combines convenience and reliability with small size and weight.

A further object is to provide a detector for gamma radiations having means for adjusting its sensitivity in accordance with different counting rates to provide uniformity of its statistical accuracy under different conditions.

Another object of the invention is to provide a detector for gamma-ray detection having means for adjusting its degree of accuracy according to the requirements of different conditions of use.

Further objects of the invention will become apparent as the description proceeds.

The invention in one form comprises a Geiger-Müller tube or like device connected to trigger a cold-cathode gaseous discharge tube (referred to hereinafter as a cold-cathode valve) arranged so that a pulse of anode current occurs when the valve is triggered, integrating means being provided which are fed with anode current pulses from the valve and which control the operation of an indicating device such as a meter.

A cold-cathode valve comprises a cathode, an anode and a trigger electrode adjacent the cathode, or the anode, and the envelope contains an inert or other gas or a mixture of gases. When a voltage is applied to break down the trigger-cathode or trigger-anode gap, anode current may flow provided the anode voltage is sufficiently high to maintain a glow discharge. After a glow discharge between anode and cathode has begun, the trigger voltage has no further influence, but the glow discharge can be ended by reducing the anode-cathode voltage below a critical value known as the maintaining voltage. De-ionization then takes place, and occupies a time (the recovery time) which depends on the extent to which ionization has been allowed to proceed; if the anode voltage is restored during the recovery time, anode current will flow again even though the trigger-cathode or trigger-anode gap has not been broken down by an applied voltage.

The cold-cathode valve may be so connected and arranged that the flow of anode current causes the trigger-cathode or trigger-anode gap current to be quenched, whereby ionization due to triggering is limited, and the recovery time of the valve is reduced: for this purpose, the load resistance of the valve may be connected in a part of the anode-cathode circuit which is common to the trigger-cathode circuit.

The recovery time may be further reduced by providing means for limiting the trigger-cathode current; such means may take the form of a resistance in series between the source of triggering pulses and the trigger, the resistance being shunted by a condenser to pass the steep fronts of the triggering pulses.

In the application of the invention to portable exploring means, it is convenient to provide a plurality of ionization devices—say three—each connected to trigger its own cold-cathode valve, separate integrating means being provided for each valve, and the several integrating means being connected to operate common indicating means. The ionization devices and their associated cold-cathode valves may be arranged in a search unit mounted at the end of a rod which the operator holds in his hand, the remaining equipment being carried by the operator elsewhere on his person. Such apparatus is suitable for detecting points on or near the earth's surface at which the gamma-ray intensity is above the normal. The search unit may be provided with a cavity round which the ionization devices are grouped, mineral samples whose gamma-ray activity is to be studied being inserted into the cavity.

An exploring device such as that described in the preceding paragraph may be arranged to give a maximum indication (for example, a full scale meter deflection) under conditions corresponding to any of a plurality of different counting rates. The statistical accuracy of the device is proportional to the square root of the product of the counting rate and the time during which the pulses from the cold-cathode valves are integrated, and it is therefore proposed to vary the integrating time when the counting rate is changed, in such a manner that substantially the same statistical accuracy obtains at all counting rates. The speed of operation is thus kept as high as possible under all conditions. A switch may be provided to give a choice of two or more accuracies: one accuracy may be chosen to be suitable for search purposes, and the other for measurements.

Embodiments of the invention are shown in the accompanying drawings.

Figure 1 is a circuit diagram wherein the triggering of the cold cathode valve is effected between trigger electrode and cathode, and Figure 2 is a circuit diagram wherein triggering is effected between trigger electrode and anode.

Referring to Figure 1 a Geiger-Müller tube has its anode 2 connected through a high resistance 3 to a point at a suitable high operating potential. A condenser 4 is connected between the anode 2 and earth. The cathode 5 is connected through a resistance 6 to the trigger of a cold-cathode valve 7, and resistance 6 is shunted by condenser 8.

The cathode of valve 7 is connected through a resistance 9 to the negative terminal of a battery 10, a point in which at about (say) +75 v. is connected through resistance 11 to the joinder of cathode 5 and resistance 6.

The anode of valve 7 is connected through resistance 12 and variable resistance 13, and microammeter 14 in series, to the positive terminal of battery 10, and a condenser 15 is shunted across resistance 12 and the meter 14, through a switch 20. A condenser 15a may be selected by switch 20 in place of condenser 15 for the purpose of selecting a different accuracy for the equipment as hereinafter described. A further condenser 16 is connected between the joinder of resistances 12 and 13 and the cathode of valve 7 through a switch 21. Here also additional condensers 16a, 16b, 16c and 16d are provided, which may be selected alternatively by means of the switch 21 to provide five different ranges of measurement as hereinafter described.

When gamma radiation passes through the Geiger-Müller tube, positive pulses are produced across resistance 11, and the pulse amplitude is such that the trigger-cathode gap in valve 7 is broken down. Resistance 6 limits the trigger current to the lowest tolerable value, and may be, say, 10 megohms; the steep leading edges of the pulses pass through condenser 8. Anode current flows as soon as sufficient ions are available in the trigger-cathode space.

When the tube 7 is conditioned for current flow by the ionising effect of the trigger pulse, condenser 16 discharges through the tube, the discharge current being limited by resistance 12. Consequently the condenser voltage falls until the anode-to-cathode voltage is less than the maintaining voltage whereupon anode current ceases, the tube begins to de-ionise, and the condenser 16 begins to recharge through the resistance 9. The time for recharge must be sufficient to allow de-ionisation in the tube to proceed far enough to prevent re-establishment of the discharge.

De-ionisation is aided in the following way. As condenser 16 discharges through the tube and falls in voltage, the cathode potential rises and in so doing reduces not only the anode-to-cathode voltage but also the trigger-to-cathode voltage. Consequently the trigger-to-cathode discharge is rapidly quenched and ionisation due to this discharge is thus limited to the short time immediately following the leading edge of each input pulse. This effect is secured by the connection of resistance 9 to be common to the condenser charging circuit and to the trigger circuit.

It will be seen that as a result of each triggering pulse, the condenser is discharged by the tube and recharged, a pulse of current appearing in the condenser charging circuit. These pulses are integrated in circuit 13, 14, 15 and the meter reaches means current. The integrating time is RC, where R is the value of resistance 13 together with that of the meter, and C is the capacity of condenser 15.

This time constant may be varied to provide different orders of accuracy by varying the value of resistance 13 or by changing over from condenser 15 to condenser 15a by means of switch 20 these adjustments being provided alternatively or additionally to one another.

In a more elaborate arrangement of the kind described, three Geiger-Müller tubes are employed; since a larger cathode area is then available, the overall triggering rate is higher than with one tube only, and greater statistical accuracy and/or speed of response can be obtained. Each Geiger-Müller tube is associated with a circuit as shown in the drawing, the three circuits sharing the same meter and battery. In each circuit, a bank of five fixed condensers corresponding to the condensers 16, 16a, 16b, 16c and 16d is provided, any of which may be selected, in each circuit, by a single range switch. The several condensers in each bank have different values, which are so chosen that any of five different counting rates can be had. The range switch also varies the effective resistance and capacity in the meter circuit, so that a different integrating time is obtained for each counting rate; preferably, the variation of integrating time is made such that the same statistical accuracy holds for each counting rate. If desired, an additional switch may be provided to switch into and out of the meter circuit a further condenser, the arrangement being such that the additional switch provides a choice of two accuracies.

Conveniently, the three Geiger-Müller tubes are mounted in a hand probe of suitable form, the operator carrying the battery for operating the Geiger-Müller tubes in a pack on his back, and having the rate and accuracy switches, the meter and the battery for the cold-cathode valves mounted in a small, third unit carried on the front of a belt. A pair of telephones may be provided to enable the operator to monitor the gamma-ray noise.

Various modifications are possible in the circuitry. According to one such modification, it has been found that, the discharge through the valve 7 when a counting impulse occurs causes the trigger electrode to perform an upward voltage excursion followed by a downward voltage sweep, and if the connection from the cathode of the Geiger-Müller tube through resistance 11 to the bias potential on battery 10 is removed this voltage excursion can be employed to quench the Geiger-Müller tube, thus enabling a non-self-quenched type of tube to be employed. A considerable advantage is thereby obtained in view of the smaller susceptibility to damage and ageing of Geiger-Müller tubes not provided with a quenching filling.

In Figure 2, the circuit is operated with the cathode 22 of the Geiger-Müller tube 23 earthed so that it may form the casing of the instrument. The output signal is taken from the anode 24. The tube 23 is quenched externally, that is, it is quenched by a negative voltage swing on the anode 24 and hence a non-self-quench tube may be used. The quenching is achieved by using a cold cathode valve 25 in which the trigger electrode 26 is arranged in proximity to the anode 27 so as to produce a triggering discharge between the trigger electrode 26 and the anode 27 when the tube anode 24 pulses negatively due to the normal action of the tube. An anode voltage of 1100 volts relative to earth is employed for the valve 25 and the anode load resistance 28 (replacing the cathode load resistance 9 of Fig. 1)

is chosen so that the downward voltage swing, produced on the trigger electrode 26 by the passage of the discharge through the valve is made adequate to quench the tube 23.

The anode supply voltage is provided by a battery 29 of 350 volts having its negative terminal associated with a 750 volt supply point 30 through high resistance 31 shunted by condenser 34. The trigger electrode 26 floats about 250 volts above the potential of cathode 35 (i. e., anode trigger voltage difference less than breakdown). The discharge in valve 25 produces a downward voltage excursion on the anode 27 down to a voltage 110 volts above cathode, and the trigger electrode is carried to approximately the same potential, that is, it is brought down by about 140 volts from the normal "floating" valve. This downward excursion on the trigger electrode is adequate to quench the tube 23, the anode of tube 23 being connected to the trigger electrode 26 by way of resistance 32 shunted by condenser 33. The other components of the circuit not specifically referred to are similar to the equivalent components of Figure 1, and carry the same reference numerals.

In the arrangement of Figure 2, it is preferable to obtain the correct floating voltage on the trigger of the cold cathode valve initially by artificially inducing a discharge through the valve. This requirement may be taken care of by the initial voltage difference between the anode and trigger electrode of the valve. If necessary, the anode voltage of the valve 25 may be raised temporarily, before operations are started, to a sufficient voltage to cause the valve to pass a discharge.

The arrangement described with reference to Figure 2 has the advantage that the speed of response is increased owing to the reduction in capacity between trigger electrode and earth.

I claim:

1. A counting-rate meter comprising a cold-cathode gaseous-discharge tube having two main electrodes and a trigger electrode, a condenser and a charging circuit therefor, a triggering circuit in series with said triggering electrode and one of said main electrodes, connections for discharging said condenser through said tube by way of the main electrodes thereof and an integrating network connected in said charging circuit.

2. A counting-rate meter according to claim 1 including a resistance common to and in series with both of said triggering circuit and said condenser-charging circuit.

3. A counting-rate meter according to claim 1 including switch means for changing the effective value of said condenser and the time constant of said integrating network in simultaneous steps.

4. Radiation meter comprising a Geiger-Müller counter, a cold-cathode gaseous-discharge tube having two main electrodes and a trigger electrode, a trigger circuit coupling said counter and said tube for developing a triggering pulse between said trigger electrode and one of said main electrodes when said counter is excited, a condenser and a charging circuit therefor, connections including a current-limiting resistance for discharging said condenser through said tube by way of said main electrodes when said tube is triggered and a counting rate meter comprising an integrating network connected in said condenser charging circuit.

5. Arrangement according to claim 4 including a resistance common to said trigger circuit and said condenser charging circuit so that as said condenser discharges the effective trigger voltage is reduced to quench the trigger discharge through said tube.

6. Arrangement according to claim 4 wherein said trigger circuit comprises the shunt combination of a high resistance and a condenser connected between said trigger electrode and said gamma-radiation-sensitive counter to limit the trigger discharge current and to pass the steep leading edges of pulses resulting from excitation of said gamma-radiation-sensitive device.

7. Radiation meter comprising a self-quenched Geiger-Müller tube, a cold-cathode gaseous discharge tube having a cathode, an anode and a trigger associated with said cathode, a loop circuit including a condenser, a resistance a source of operating voltage and an integrating network, connections including a junction of said condenser said resistance and said cathode for the discharge of said condenser through said cold-cathode tube, a resistive bias connection between said trigger and said source, and a feed connection to said trigger from the cathode of said Geiger-Müller tube.

8. Radiation meter according to claim 7 said integrating network comprising a resistance and a current-meter in series and a condenser in shunt thereto.

9. Radiation meter according to claim 7 including switch-means for changing the effective value of said condenser and the time constant of said integrating network in simultaneous steps.

10. Radiation meter according to claim 7 said feed connection comprising the shunt combination of a high resistance and a condenser to limit the trigger discharge current and to pass the steep leading edges of pulses developed by said Geiger-Müller tube.

11. Radiation meter comprising a self-quenched Geiger-Müller tube, a cold-cathode gaseous-discharge tube having a cathode, an anode and a trigger associated with said anode, a loop circuit including a condenser, a resistance, a source of operating voltage and an integrating network, connections including a junction of said condenser, said resistance and said anode for the discharge of said condenser through said cold-cathode tube, a resistive bias connection between said trigger and said source, and a feed connection to said trigger from the anode of said Geiger-Müller tube.

12. Radiation meter comprising a non-self-quenched Geiger-Müller tube having a biased electrode and an output electrode, a cold-cathode gaseous-discharge tube having two main electrodes and a trigger electrode, said trigger electrode and said output electrode being connected solely together, a condenser and a charging circuit therefor, connections including a current-limiting resistance for discharging said condenser through said cold-cathode tube by way of said main electrodes, and a counting rate meter comprising an integrating network connected in said condenser-charging circuit.

13. Radiation meter comprising a non-self-quenched Geiger-Müller tube having a positively biased electrode and a floating electrode, a cold-cathode gaseous-discharge tube having a cathode, an anode and a trigger associated with said cathode, a connection between said trigger and said floating electrode, a loop circuit including a condenser, a resistance, a voltage source and an integrating network, and connections including a junction of said condenser, said resistance and said cathode for the discharge of said condenser through said cold cathode tube.

14. Radiation meter comprising a non-self-quenched Geiger-Müller tube having a negatively biased electrode and a floating electrode, a cold-cathode gaseous-discharge tube having a cathode, an anode and a trigger associated with said anode, a connection between said trigger and said floating electrode, a loop circuit including a condenser, a resistance, a voltage source and an integrating network, and connections including a junction of said condenser, said resistance and said anode for the discharge of said condenser through said cold cathode tube.

15. A device for detecting penetrating radiation comprising means to convert the radiation into electrical impulses, a gaseous discharge device having input and output means, energizing means connected to said gaseous discharge device, coupling means connecting said radiation converting means to said input means, means to energize said radiation converting means through said gaseous discharge device, and means connected to said output means and operable to indicate the radiation upon the occurrence of an electrical impulse in said radiation converting means which is automatically impressed on said gaseous discharge device by said coupling means and said input means.

16. A device for detecting penetrating radiation comprising means to convert the radiation to electrical impulses including a pair of electrodes within a container and an ionizable gaseous medium therebetween, a gaseous discharge device having input and output means, energizing means connected to said gaseous discharge device, coupling means connecting one electrode of said radiation converting means to said input means, means to apply a potential between the electrodes of said radiation converting means through said gaseous discharge device and including said coupling means and said input means, and means connected to said output means and operable to indicate the radiation upon the occurrence of an electrical impulse in said radiation converting means which impulse is automatically impressed on said gaseous discharge device by said coupling means and said input means.

17. A device for detecting penetrating radiation comprising means to convert the radiation to electrical impulses including a pair of electrodes within a container and an ionizable medium therebetween, a gaseous discharge device having a control electrode, energizing means for said gaseous discharge device comprising a source of potential and deionizing means in series with said source and said gaseous discharge device, coupling means connecting one electrode of said radiation converting means to the control electrode of said gaseous discharge device, means to energize said radiation converting means through said gaseous discharge device including said coupling means, and means connected to said gaseous discharge device and operable to indicate the radiation upon the occurrence of an electrical impulse in said radiation converting means which impulse is automatically impressed on the control electrode of said gaseous discharge device by said coupling means.

18. A device for detecting penetrating radiation comprising means to convert the radiation to electrical impulses, a cold gaseous discharge tube, input means and output means for said cold gaseous discharge tube, energizing means connected to said cold gaseous discharge tube, coupling means connecting said radiation converting means to said input means, means to energize said radiation converting means through said cold gaseous discharge tube and including said input means and said coupling means, and means connected to said output means and operable to indicate the radiation upon the occurrence of an electrical impulse in said radiation converting means which impulse is automatically impressed on said cold gaseous discharge tube by said coupling means and said input means.

19. A device for detecting penetrating radiation comprising means to convert the radiation to electrical impulses, a cold gaseous discharge tube having a control electrode, coupling means connecting said radiation converting means to the control electrode of said cold gaseous discharge tube, energizing means connected to said cold gaseous discharge tube, means to energize said radiation converting means through said cold gaseous discharge tube including said coupling means and said control electrode, and means connected to said cold gaseous discharge tube and operable to indicate the radiation upon the occurrence of an electrical impulse in said radiation converting means which impulse is automatically impressed on said cold gaseous discharge tube by said coupling means and said control electrode.

20. A device for detecting penetrating radiation comprising means to convert the radiation into electrical impulses, a cold gaseous discharge tube having a cathode electrode, a control electrode and a collector electrode; energizing means for applying an ionizing potential to the collector electrode of said cold gaseous discharge tube, coupling means connecting said radiation converting means to the control electrode of said cold gaseous discharge tube, means to energize said radiation converting means through said cold gaseous discharge device including the cathode and control electrode of said cold gaseous discharge tube and said coupling means, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

21. A device for detecting penetrating radiation comprising means to convert the radiation to electrical impulses including a pair of electrodes within a container and an ionizable medium therebetween, a cold gaseous discharge tube having cathode, control and collector electrodes; energizing means for applying an ionizing potential to the collector electrode of said cold gaseous discharge tube, coupling means connecting one of the electrodes of said radiation converting means to the control electrode of said cold gaseous discharge tube, means for applying a potential between the electrodes of said radiation converting means through said cold gaseous discharge tube including the cathode and control electrodes thereof, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

22. A device for detecting penetrating radiation comprising means to convert the radiation into electrical impulses including a pair of electrodes within a container and an ionizable medium therebetween, a cold gaseous discharge tube having cathode, control and collector electrodes; energizing means for applying an ionizing potential to the collector electrode of said cold gaseous discharge tube comprising a source of potential to ionize said cold gaseous discharge tube and including deionizing means connected in the said source of potential and said cold gaseous discharge tube, coupling means connecting said radiation converting means to the control electrode of said cold gaseous discharge tube, means for applying a potential between the electrodes of said radiation converting means through said cold gaseous discharge tube including the cathode and control electrodes thereof, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

References Cited in the file of this patent

UNITED STATES PATENTS

| Number | Name | Date |
| --- | --- | --- |
| 2,122,222 | Vingerhoets | June 28, 1938 |
| 2,428,149 | Falk | Sept. 30, 1947 |
| 2,549,058 | Constable | Apr. 17, 1951 |

OTHER REFERENCES

Gingrich, Review of Scientific Instruments, vol. 7, May 1936, pp. 207–210.

Borkowski et al., Atomic Energy Commission document AECD—2410, June 30, 1945, 20 pp.

Korff, Electron and Nuclear Counters, D. Van Nostrand Co. Inc., N. Y., 1945, pp. 162, 163, 183.